United States Patent [19]

Auerbach et al.

[11] Patent Number: 4,766,535

[45] Date of Patent: Aug. 23, 1988

[54] HIGH-PERFORMANCE MULTIPLE PORT MEMORY

[75] Inventors: Daniel J. Auerbach; Tien C. Chen; Wolfgang J. Paul, all of San Jose, Calif.

[73] Assignee: International Business Machines Corporation, Armonk, N.Y.

[21] Appl. No.: 811,624

[22] Filed: Dec. 20, 1985

[51] Int. Cl.[4] .................. G06F 12/00; G06F 13/00; G06F 13/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,016,545 | 4/1977 | Lipouski | 364/900 |
| 4,245,304 | 1/1981 | Porter et al. | 364/200 |
| 4,317,168 | 2/1982 | Messina et al. | 364/200 |
| 4,381,541 | 4/1983 | Baumann, Jr. et al. | 364/200 |
| 4,424,561 | 1/1984 | Stanley et al. | 364/200 |
| 4,453,230 | 6/1984 | Mizoguchi et al. | 364/900 |
| 4,467,414 | 8/1984 | Akagi et al. | 364/200 |
| 4,580,215 | 4/1986 | Morton | 364/200 |
| 4,600,986 | 7/1986 | Scheuneman et al. | 364/200 |
| 4,652,993 | 3/1987 | Scheuneman et al. | 364/200 |
| 4,654,788 | 3/1987 | Boudreau et al. | 364/200 |
| 4,674,032 | 6/1987 | Michaelson | 364/200 |
| 4,724,520 | 2/1988 | Athanas et al. | 364/200 |

OTHER PUBLICATIONS

"Introduction to Computer Architecture", 2nd Edition, H. Stone, Editor, Science Research Associates, Chicago, 1980, Chapter 9.

Primary Examiner—Gareth D. Shaw
Assistant Examiner—Joseph T. FitzGerald
Attorney, Agent, or Firm—Mark A. Haynes; Henry E. Otto, Jr.

[57] ABSTRACT

Disclosed is a multiple port memory apparatus responsive to r+w addresses within an instruction cycle for supplying data read from the r read addresses and for writing data received to the w write addresses. The memory apparatus comprises r groups of w+1 memory banks, responsive to the r read addresses and the w write addresses, for supplying for each of the r read addresses data read from one of the w+1 banks in one of the r groups and for writing data received to each of the w write addresses in the other of the w+1 banks in the r groups. A pointer for controlling the r groups of w+1 memory banks directs the read and write accesses to the memory banks so that one of the w+1 banks obtaining valid data is read in response to a read address and so that data is written to the other banks in each cycle.

The pointer directs memory accessing to prevent conflicts. Conflicts are always avoided because one bank in each of the r groups is directed to supply data in response to a read address and the w remaining banks are available for writing data in response to the w write addresses redundantly so that each of the groups of memory banks will have valid data in at least one of its w+1 memory banks for a given address.

6 Claims, 8 Drawing Sheets

CONFIGURATION AFTER 1st OPERATION IN EXAMPLE

CONFIGURATION AFTER 2nd OPERATION IN EXAMPLE

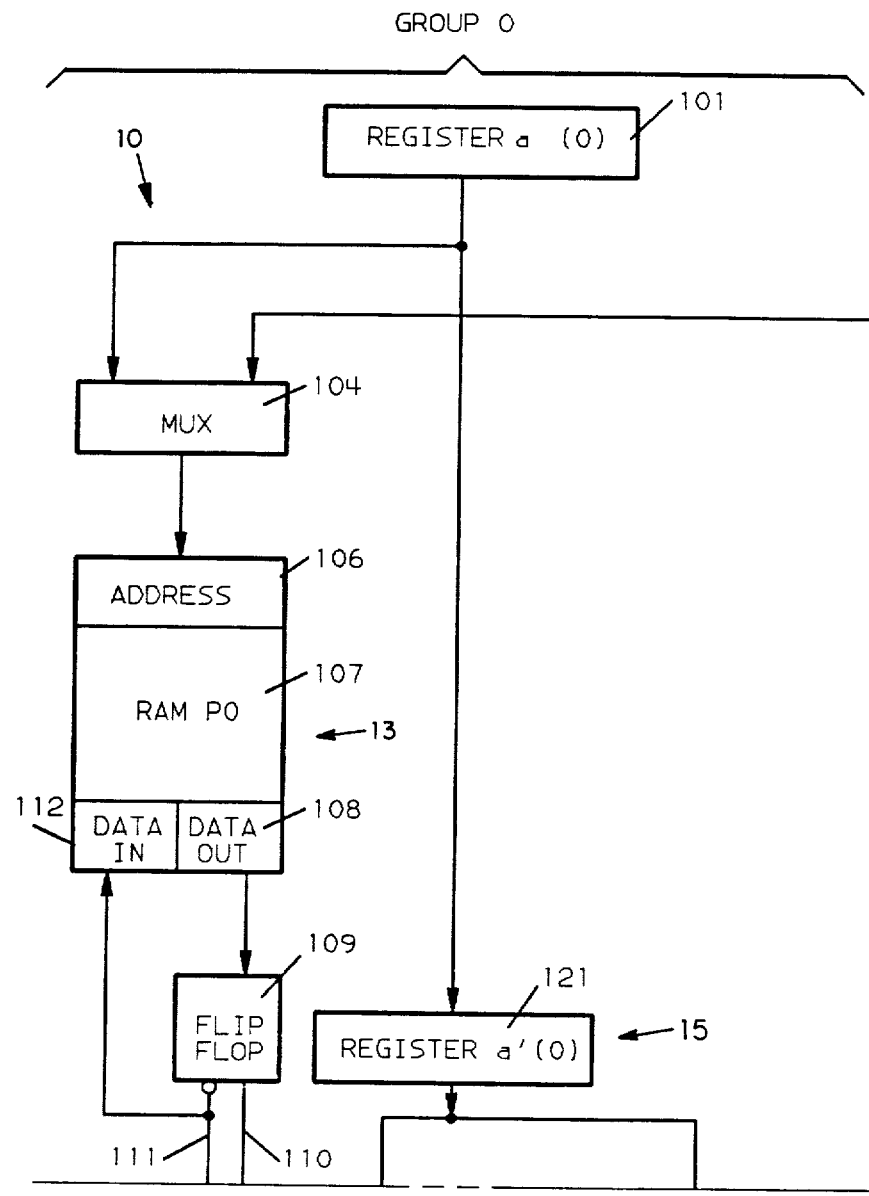
FIG. 2A
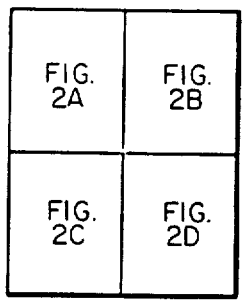
KEY TO FIG. 2

HIGH-PERFORMANCE MULTIPLE PORT MEMORY

FIELD OF THE INVENTION

The present invention relates to multiport random access memory devices that read and write data to and from several addresses within a given instruction cycle.

BACKGROUND OF THE INVENTION

In a computer for high-performance computation, the memory has to provide for reading and writing data to the memory at a bandwidth which matches the bandwidth of processing. One approach for matching the processing bandwidth in the prior art has been the use of the cache concept, that is using a fast memory to contain a working set of data so that the processor has quick access to currently active data.

In large scale scientific computations, especially those using pipeline techniques (see for example the review by T. C. Chen in Chapter 9 of *Introduction to Computer Architecture*, second edition, H. Stone, Editor, Science Research Associates, Chicago, 1980), even the fast cache is taxed to the limit. Take the case, for instance, of handling a three-address floating point code:

$$A \text{ op } B = C,$$

where A and B are addresses for operands and C is the result of the operation op on the operands A and B. If the operation is done in a pipeline fashion, using n stages, then as the computation reaches a steady state, at every machine cycle, two operands enter the computation pipe while a third operand carrying the result of the operation started n cycles earlier is stored. The total demand is three memory operations per cycle.

As the performance of the processor increases to shorter and shorter cycle times, the time required for the three memory operations becomes a bottleneck for creating faster and faster processors.

Traditional pipeline "vector" designs use very high-speed memories and/or require strong constraints on memory size and freedom of addressing. The CRAY 1, for example, uses 8 vector registers, each of 64 words, for a total of 512 floating point words, and every vector is used from the beginning and runs consecutively. Thus the CRAY 1 is constrained to a relatively small memory and a rigid addressing scheme.

One prior art approach to reducing the amount of time required for three memory operations per cycle uses the replicated memory approach. If a single conventional memory bank is used for the three address computation, the memory bank would have to perform two fetches and one store for a total of three units gainful work per cycle. The replicated memory approach supplies two identical memory banks, and stores everything in duplicate, one copy in each bank, to alleviate the fetch bandwidth. By storing everything in duplicate, the fetch bandwidth is alleviated by fetching one operand from each bank in parallel and storing the result back to both banks in parallel. Each bank in such a system performs two units of work, one fetch and one store in each cycle, rather than three. Thus the replicated memory approach of the prior art appears to be 1.5 times as fast as the single bank memory. So the replicated memory approach of the prior art requires that an instruction cycle squeeze two memory access cycles in, rather than three of the single bank memory.

Both the single bank memory and the replicated memory approach of the prior art are limited in performance because of the possibility of conflict of accesses to the memory between a read operation and a write operation. Thus the read operation must be done at a time apart from the write operation.

SUMMARY OF THE INVENTION

The present invention provides a multiple port memory device that overcomes the possibility of conflicts between read and write accesses to the memory and thereby enhances the performance of the memory device.

The present invention is a multiple port memory apparatus responsive to $r+w$ addresses within an instruction cycle for supplying data read from the r read addresses and for writing data received to the w write addresses. The memory apparatus comprises r groups of $w+1$ memory banks, each group responsive to one of the r read addresses and all of the w write addresses, for supplying for each of the r read addresses data read from one of the $w+1$ banks in one of the r groups and for writing data received to each of the w write addresses in the other of the $w+1$ banks in the r groups. A pointer means for controlling the r groups of $w+1$ memory banks directs the read and write accesses to the memory banks so that one of the $w+1$ banks obtaining valid data is read in response to a read address and so that data is written to the other banks in each cycle.

The pointer means directs memory accessing to prevent conflicts. Conflicts are always avoided because one bank in each of the r groups is directed to supply data in response to a read address and the w remaining banks are available for writing data in response to the w write addresses redundantly so that each of the groups of memory banks will have valid data in at least one of its $w+1$ memory banks for a given address.

DETAILED DESCRIPTION

With reference to the figures, a detailed description of the preferred embodiment of the present invention is provided.

I. Generalized Description

In this invention there is shown a way to build a pipelined multiport RAM (random access memory), which has M locations for storage of data items of width d, and which is capable of performing within one cycle r read operations and w write operations, and which has a cycle time t.

Data items are stored in r groups of banks of conventional RAM, which have a cycle time t. Each group has $w+1$ banks, called bank 0, . . . , bank w of that group. Each bank has M locations for storage of data items of width d.

Each group also has a pointer RAM having a cycle time equal to or less than $t/(w+1)$. The pointer RAM has M locations for storage of data items of width of at least $(\log_2(w+1))$, so that in one location of the pointer RAM of a group of banks one can store a pointer to a particular bank of that group.

The following property is established initially and is maintained during operation of the multiport RAM:

If data item I is stored in location 1 of the multiport RAM, then in each group g there is a bank $b(g,1)$ such that a valid copy of data item I is stored at location 1 of bank $b(g,1)$. The pointer to bank $b(g,1)$ is stored at location 1 of the pointer RAM of group g.

An operation of the multiport RAM with read addresses $a(0)$, ..., $a(r-1)$ and write addresses $c(0)$, ..., $c(w-1)$ is executed in the following way.

For each group g the value $b(g,a(g))$ is fetched from location $a(g)$ of the bank b indicated by the pointer in the pointer RAM of group g. This takes time $t/(w+1)$. Concurrently write conflicts (equality of two of the write addresses) can be discovered.

For each group g the content of location $a(g)$ of bank $b(g,a(g))$ of group g is fetched. This takes time equal to or less than t and keeps one bank of each group busy reading.

For each group g each of the w banks b in g which is not busy reading performs one of the w write operations. One way to do this is to perform in bank b the write operation to location $c(b)$ if b is less than $b(g, a(g))$ and to perform in bank b the write operation to location $c(b-1)$ if b is greater than $b(g, a(g))$. In this case within each group each write address $c(i)$ has to be routed only to two memory banks, namely to banks i and $i+1$.

For each group g the index b of the bank in group g which performs the write operation to location $c(b)$ is stored in location $c(b)$ of the pointer RAM of group g. This is done sequentially for each write address and takes no more than time $wt/(w+1)$. If after this the next addresses $a(1)$, ..., $a(r-1)$, $c(1)$, ..., $c(w-1)$ are already available, then the lookup of the next indices $b(g,a(g))$ can already be started and overlapped with the last $1/(w+1)$'th of the cycle time of the banks while the banks finish the previous operation.

II. Method of Operation

Figure 1A:
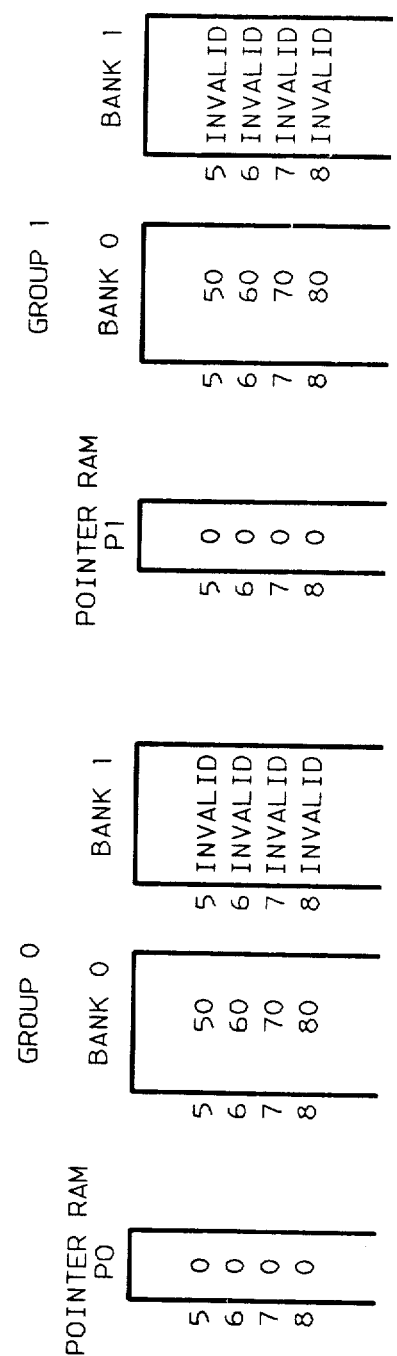
FIGS. 1A, 1B, and 1C are charts used to illustrate the principle of operation of the present invention.
Figure 1B:
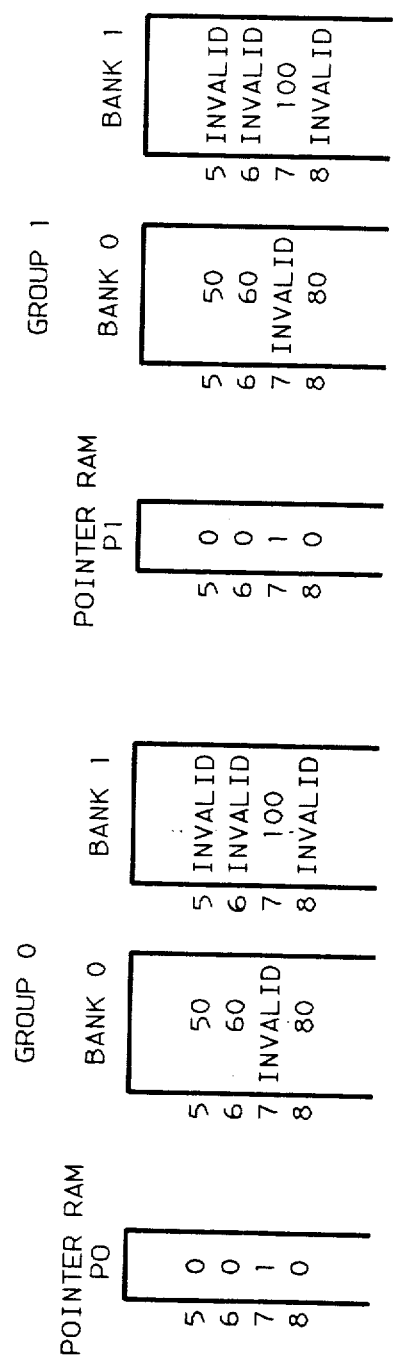
Figure 1C:
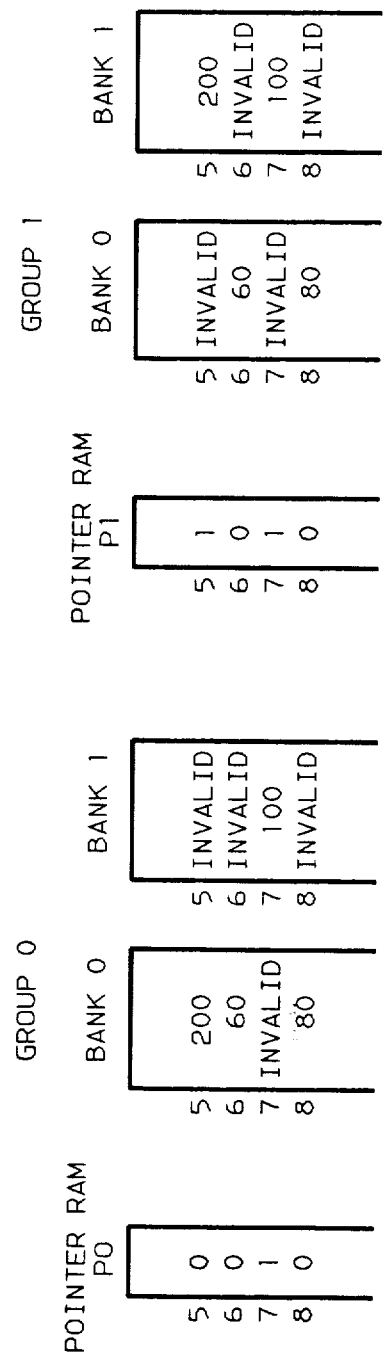

FIGS. 1A through 1C illustrate an example of the operation of the multiport RAM of the present invention, where $r=2$ and $w=1$. Thus there are 2 groups of banks, say group 0 and group 1. Each group has 2 banks, called bank 0 and bank 1. The pointer RAM for group 0 is called P0 and the pointer RAM for group 1 is called P1.

Assume, as shown in FIG. 1A, that the initial contents of locations 5, 6, 7 and 8 of the multiport RAM are the values 50, 60, 70 and 80. Further assume that initially locations 5, 6, 7, 8 of bank 0 of each group have valid data, and that this is reflected by value 0 at locations 5, 6, 7, 8 of the two pointer RAMs P0, P1.

Now assume a first operation is performed with addresses $a(0)=5$, $a(1)=6$ and $c(0)=7$. Further assume that in this operation value 100 is written to location 7.

Then the index $b(0,5)$ of the bank in group 0 which has valid data in location 5 is fetched by a read from location 5 in pointer RAM P0. Similarly, the index $b(1,6)$ of the bank in group 1 which has valid data in location 6 is fetched by a read from location 6 in pointer RAM P1. Because $b(0,5)=0$ the read data from address $a(0)=5$ are fetched from bank 0 of group 0. Because bank 0 of group 0 is busy reading, the value 100 is written to address 7 of bank 1 of group 0. Bank 1 of group 0 now has valid data at location 7. This is reflected by writing value 1 to location 7 of pointer RAM P0 (See, FIG. 1B).

Similarly, because $b(1,6)=0$ the read data from address $a(1)=6$ are fetched from bank 0 of group 1. Because bank 0 of group 1 is busy reading, the value 100 is also written to address 7 of bank 1 of group 1. Bank 1 of group 1 now has valid data at location 7. This is reflected by writing value 1 to location 7 of pointer RAM P1. The resulting situation is shown in FIG. 1B.

Now suppose another operation is performed with read addresses $a(0)=7$, $a(2)=8$ and write address $c(0)=5$. Further assume that in this operation value 200 is written to location 5.

Then the index $b(0,7)$ of the bank in group 0 which has valid data in location 7 is fetched by a read from location 7 in pointer RAM P0. Similarly, the index $b(1,8)$ of the bank in group 1 which has valid data in location 8 is fetched by a read from location 8 in pointer RAM P1. Because $b(0,7)=1$ the read data from address $a(0)=7$ are fetched from bank 1 of group 0. Because bank 1 of group 0 is busy reading, value 200 is written to address 5 of bank 0 of group 0. Bank 0 of group 0 now has valid data at location 5. This is reflected by writing value 0 to location 5 of pointer RAM P0 (See, FIG. 1C).

Because $b(1,8)=0$ the read data from address $a(1)=8$ are fetched from bank 0 of group 1. Because bank 0 of group 1 is busy reading, value 200 is also written to address 5 of bank 1 of group 1. Bank 1 of group 1 now has valid data at location 5. This is reflected by writing value 1 to location 5 of pointer RAM P1. The new situation is shown in FIG. 1C.

III. Implementation

In FIGS. 2A, 2B, 2C and 2D there is shown a multiport RAM memory device 10 capable of concurrently performing $r=2$ read operations and $w=1$ write operations.

The memory device 10 shown in FIGS. 2A, 2B, 2C and 2D is responsive to a first address $a(0)$, a second address $a(1)$ and a third address $c(0)$ within an instruction cycle to supply data read from the first and second addresses and for writing data received to the third address. The first, second and third addresses are supplied to address registers 101, 102 and 103 respectively. The data read from the first and second addresses is supplied at output registers 129 and 149 respectively. The data received for writing to the third address is received in register 133.

The apparatus 10 includes a first group 11, labelled group 0 of two memory banks 126,132, labelled bank 0 and bank 1, respectively. The first group 11 is responsive to the first address $a(0)$ from register 101 which is moved through register 121 and multiplexers 124 and 130 to one of the two banks 126, 132. Also the first group 11 is responsive to the third address $c(0)$ which is moved through register 123 and through the multiplexers 124 and 130 to the other of the two banks, 126, 132. Data from the first address $a(0)$ is supplied from one bank of the two banks 126, 132 at the respective data output ports 127, 135. Through multiplexer 128 the data is then supplied to the output register 129. The data received at the input register 133, is supplied through the drivers 136 or 134 to the data ports 127, 135 of the two banks 126,132, only one of which is enabled for a write. The third address $c(0)$ is supplied to that one bank which is enabled for a write and the data is written. Thus data is read from one of the two banks while data is written to the other of the two banks during a given memory access cycle.

The apparatus further comprises a second group 12, labelled group 1, of two memory banks 146, 152 designated bank 0 and bank 1 respectively. The second group 12 of two memory banks 146, 152 is configured in the same manner as the first group 11, group 0. However, the second address a(1) which is moved through register 122 is supplied to multiplexers 144, 150 in conjunction with the third address c(0) from the register 123. The second group supplies data read from one of the two banks through the data port 147, 155 and the multiplexer 148 to the output register 149. The other bank writes data received from register 133 through the drivers 156 or 154 at the third address c(0).

Associated with the apparatus 10 is a pointer means for controlling the first group 11 and the second group 12 so that the one of the two banks containing valid data is read in response to the read address a(0) or a(1) and that data received through register 133 is written to the other bank.

The pointer means includes means 13, 14 for storing pointers to the banks containing valid data at the first and second addresses in the first and second groups, respectively. The means 13 is responsive to the first address a(0) from register 101 through multiplexer 104 to provide a pointer at a data output register 108. The pointer is stored in the RAM 107 and accessed through address port 106. Also the means 13 is responsive to the third address c(0) in register 103 through multiplexer 104 for writing data received at the data input port 112 to the RAM 107 at the address in the port 106. The means 14 associated with the second group 12 includes a similar apparatus except that it is responsive to the second address a(1) from register 102 rather than the first address.

Further included in the pointer means for the first group 11 is a first means 15 for supplying the first address a(0) to the one bank in the first group containing valid data and for supplying the third address to the other bank. The first means 15 includes flipflop 109 which latches the pointer supplied at the data output port 108 of the pointer RAMs 107 corresponding to the first address a(0). The pointer is maintained in the flipflop 109 which provides a true output 110 and a complement output 111. The true output 110 and complement output 111 are provided to the first group so that the multiplexers 124 and 130 supply the first address to the one bank having valid data while the other bank is enabled for a write operation. Also, the complement output 111 is supplied at the data input port 112 of the pointer RAM 107 so that a pointer indicating that valid data at the third address c(0) is stored in the other bank is written to the pointer RAM 107.

The second group also includes a second means 16 for supplying the second address a(1) to the one bank in the second group 12 containing valid data and the third address to the other bank in the second group 12. It is configured in the same manner as described above for the first group.

The operation of the apparatus 10 shown in FIGS. 2A and 2B is described in detail below.

Read addresses a(0) and a(1) are loaded into registers 101 and 102. The write address c(0) is loaded into register 103.

The pointer value b(0,a(0)) is fetched by routing address a(0) from register 101 via multiplexer 104 to address port 106 of the pointer RAM 107 of bank 0. RAM 107 performs a read and the result is loaded from data output port 108 of pointer RAM 107 into flipflop 109. The noninverting output 110 of flipflop 109 gives the index of the bank of group 0 that will perform the read operation. The inverting output 111 of flipflop 109 gives the index of the bank of group 0 that will perform the write operation and the new value of b(0,c(0)) which is routed to the data input port 112 of RAM 107.

After pointer b(0, a(0)) has been fetched, the new pointer value b(0,c(0)) is stored into RAM 107 by routing address c(0) from register 103 via mux 104 to address port 106 of the pointer RAM 107 of bank 0 and having pointer RAM 107 perform a read operation.

Similarly, the pointer value b(1,a(1)) is fetched by routing address a(1) from register 102 via multiplexer 113 to address port 114 of the pointer RAM 115 of bank 1. RAM 115 performs a read and the result is loaded from data output port 116 of pointer RAM 115 into flipflop 117. The noninverting output 118 of flipflop 117 gives the index of the bank of group 1, which will perform the read operation. The inverting output 119 of flipflop 117 gives the index of the bank of group 1 that will perform the write operation and the new value of b(1,c(0)) which is routed to the data input port 120 of RAM 115.

After pointer b(1, a(1)) has been fetched, the new pointer value b(1,c(0)) is stored into RAM 115 by routing address c(0) from register 103 via mux 113 to address port 114 of the pointer RAM 115 of bank 1 and having pointer RAM 115 perform a read operation.

At the time when the pointer values b(0,a(0)) and b(1,a(1)) are loaded in into flipflops 109 and 117, the value of address a(0) is pipelined from register 101 into register 121, and the value of address a(1) is pipelined from register 102 into register 122, and the value of address c(0) is pipelined from register 103 into register 123.

In case b(0,a(0))=0 the pipelined read address a' (0) in register 121 is routed via mux 124 to address port 125 of memory bank 126 which is bank 0 of group 0. Memory bank 126 performs a read operation. The result is routed from the data port 127 of memory bank 126 via mux 128 to the data output register 129 of group 0. Also in case b(0,a(0))=0 the pipelined write address c'(0) in register 123 is routed via mux 130 to address port 131 of memory bank 132, which is bank 1 of group 0. The data to be written into the multiport RAM is routed from data input register 133 via driver 134 to the data port 135 of memory bank 132. Memory bank 132 performs a write operation.

In case b(0,a(0))=1 the pipelined read address a'(0) in register 121 is routed via mux 130 to address port 131 of memory bank 132. Memory bank 132 performs a read operation. The result is routed from the data port 135 of memory bank 132 via mux 128 to the data output register 129 of group 0. Also in case b(0,a(0))=1 the pipelined write address c'(0) in register 123 is routed via mux 124 to address port 125 of memory bank 126. The data to be written into the multiport RAM is routed from data input register 133 via driver 136 to the data port 127 of memory bank 126. Memory bank 126 performs a write operation.

The select lines of multiplexers 124, 130 and 128, the (active low) write signals of memory banks 126 and 132 as well as the (active low) output enable signals of drivers 134 and 136 are directly controlled by the noninverted output 110 and the inverted output 111 of flipflop 109.

Similarly, in case b(1,a(1))=0 the pipelined read address a'(1) in register 122 is routed via mux 144 to address port 145 of memory bank 146 which is bank 0 of group 1. Memory bank 146 performs a read operation. The result is routed from the data port 147 of memory bank 146 via mux 148 to the data output register 149 of group 1. Also in case b(1,a(1))=0 the pipelined write address c'(0) in register 123 is routed via mux 150 to address port 151 of memory bank 152, which is bank 1 of group 1. The data to be written into the multiport RAM is routed from data input register 133 via driver 154 to the data port 155 of memory bank 152. Memory bank 152 performs a write operation.

In case b(1,a(1))=1 the pipelined read address a'(1) in register 122 is routed via mux 150 to address port 151 of memory bank 152. Memory bank 152 performs a read operation. The result is routed from the data port 155 of memory bank 152 via mux 148 to the data output register 149 of group 0. Also in case b(1,a(1))=1 the pipelined write address c'(0) in register 123 is routed via mux 144 to address port 145 of memory bank 146. The data to be written into the multiport RAM is routed from data input register 133 via driver 156 to the data port 147 of memory bank 146. Memory bank 146 performs a write operation.

The select lines of multiplexers 144, 150 and 148, the (active low) write signals of memory banks 146 and 152 as well as the (active low) output enable signals of drivers 154 and 156 are directly controlled by the noninverted output 118 and the inverted output 119 of flip-flop 117.

Figure 2:
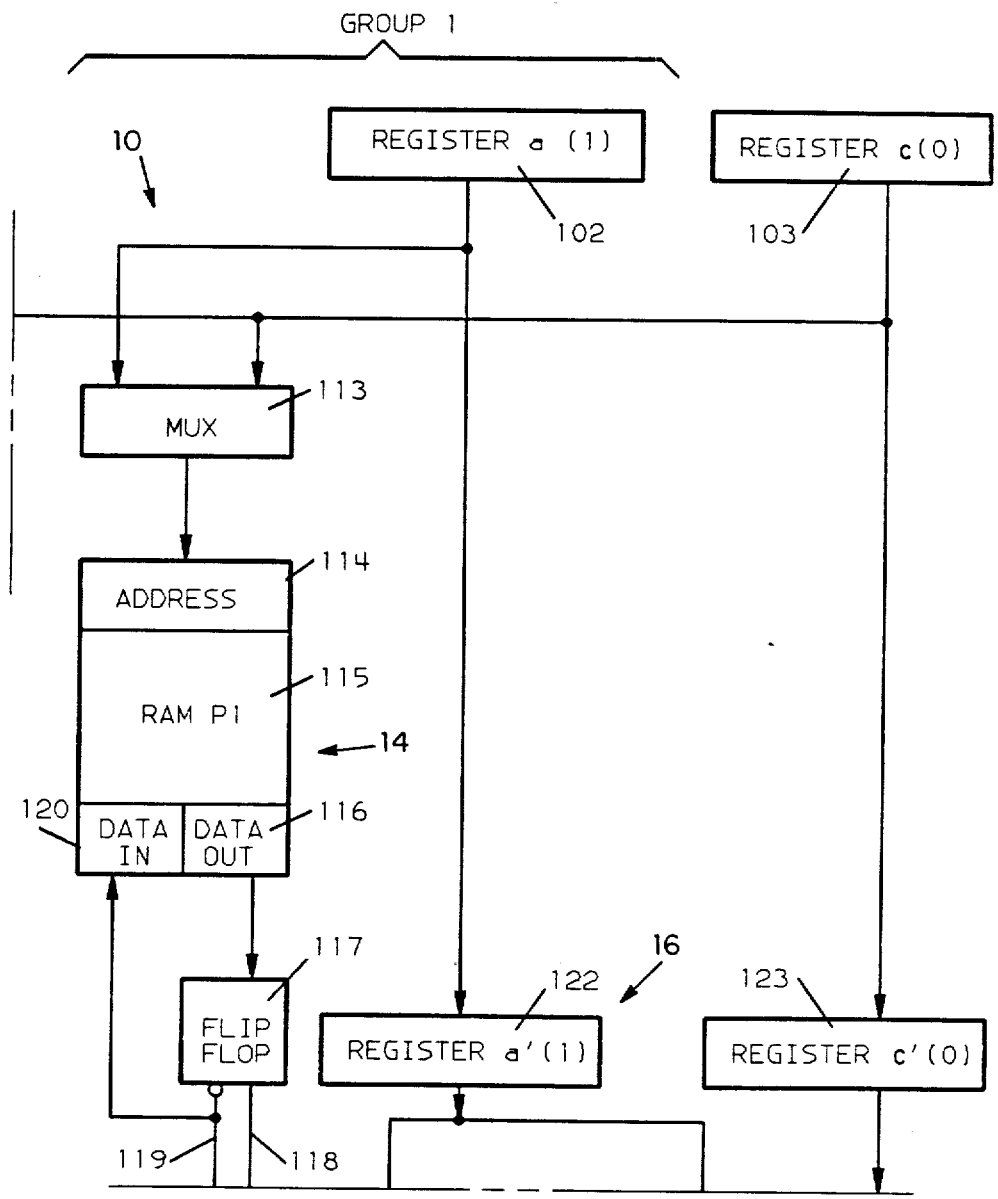
FIGS. 2A, 2B, 2C and 2D together make up a diagram of the preferred embodiment of the present invention.
Figure 2C:
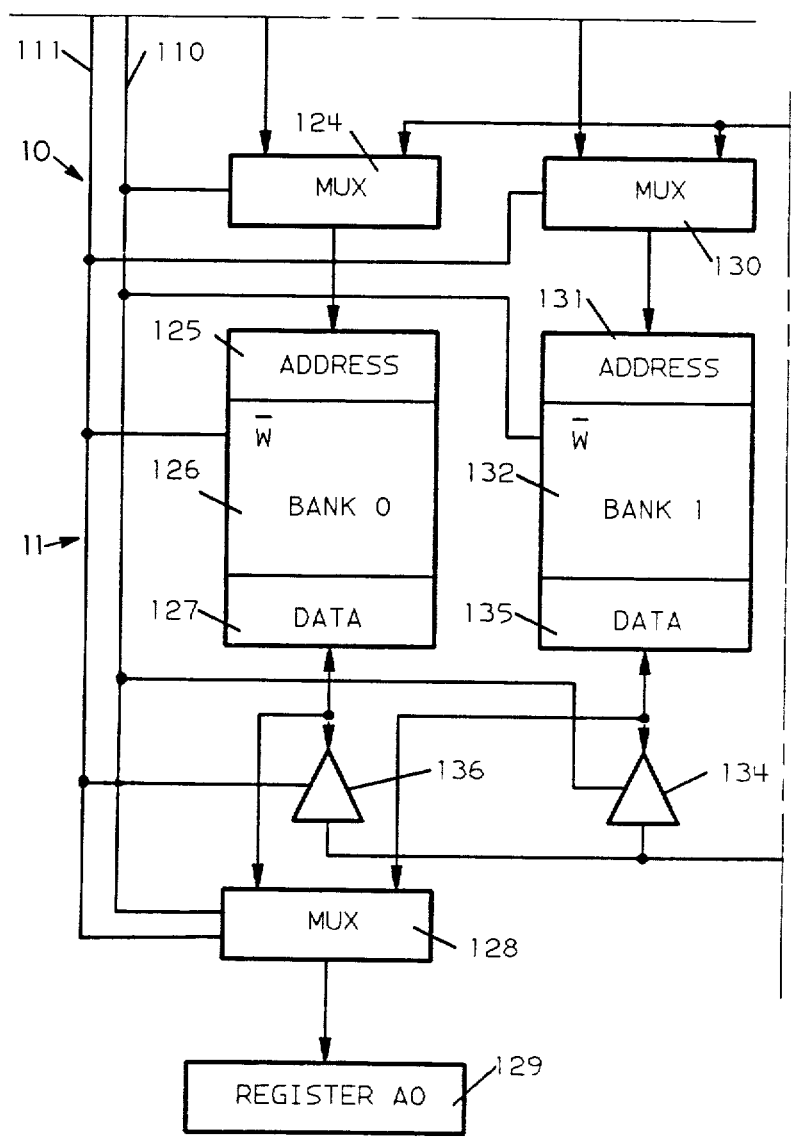
Figure 2D:
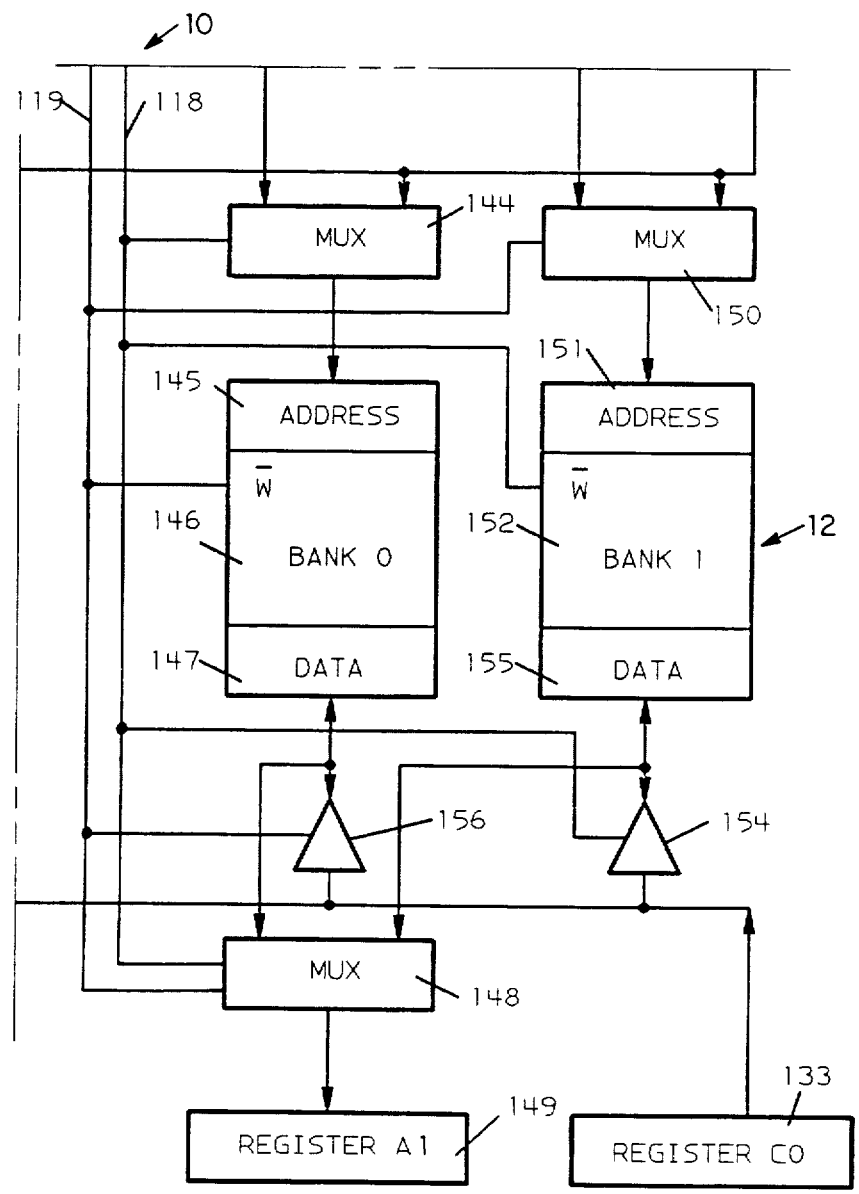
Figure 3:
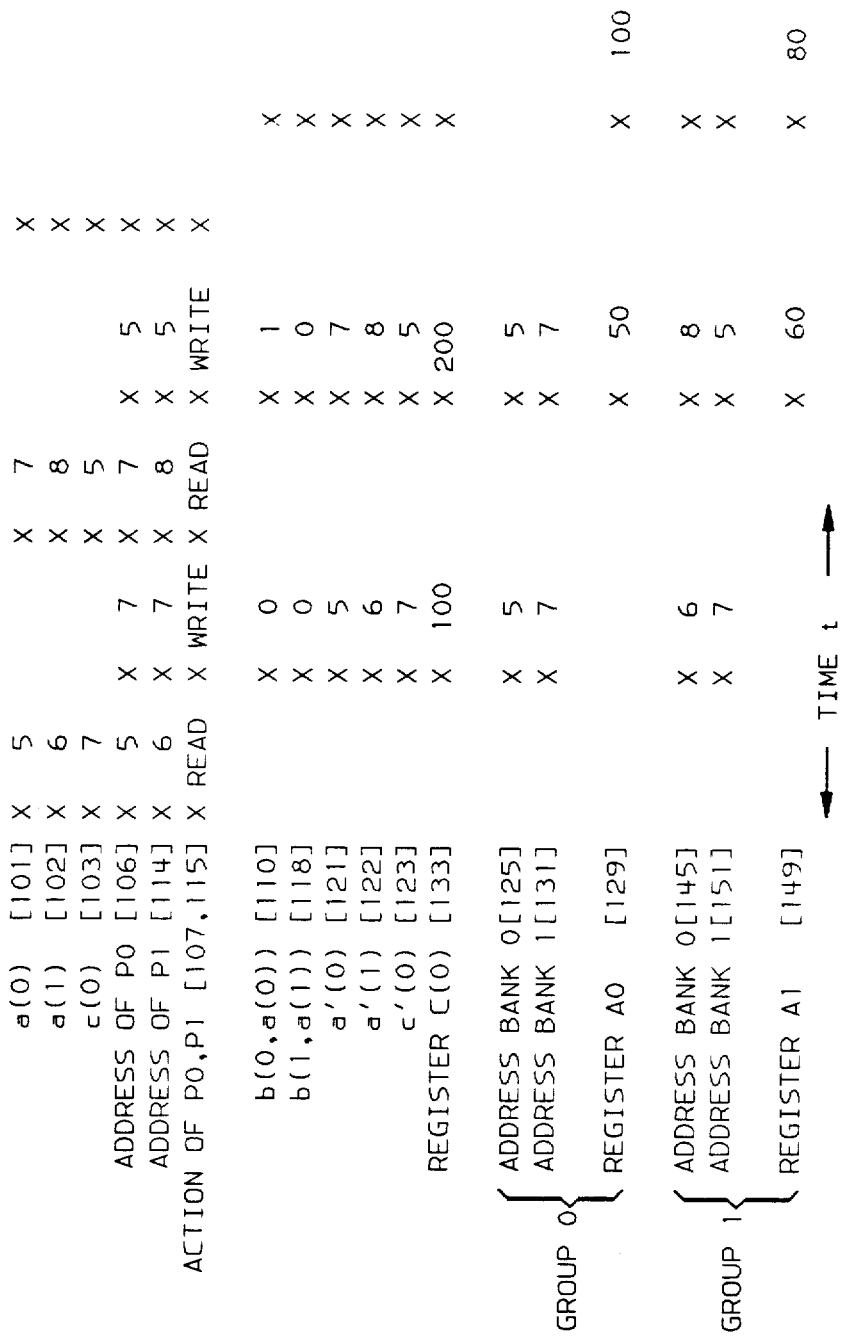
FIG. 3 is a timing chart illustrating the operation of the apparatus of FIGS. 2A, 2B, 2C and 2D while performing the example described with reference to FIGS. 1A through 1C.

FIG. 3 shows a self explanatory timing diagram for the apparatus of FIGS. 2A, 2B, 2C and 2D when the operations illustrated in FIGS. 1A, 1B and 1C are executed.

Table 1 gives a list of widely available components which can be used to build the apparatus of FIG. 2. Using these components a 3-port RAM with 2K memory locations, a cycle time of about 100 ns and capable of performing 2 reads and 1 write in 1 cycle can be built. This matches the 100 ns cycle time of the fastest floating point ALU and multiplier chips presently available.

TABLE 1

| REGISTERS | 101, 102, 103, 121, 122, 123, 129, 149, 133 | F374 |
|---|---|---|
| MULTIPLEXERS | 104, 113, 124, 130, 144, 150, 128, 148 | F157 |
| DRIVERS | 136, 134, 156, 154 | F244 |
| POINTER RAM | 107, 115 | Am93425A |
| BANK RAM | 126, 132, 146, 152 | Am9128-10 |
| FLIP-FLOP | 109, 117 | F74. |

IV. Conclusion

According to the present invention, it is clear that there is no conflict of accesses for performing multiple reads and writes in a given memory access cycle. The pointer RAMs can be made to operate very fast, and the action of the pointer RAMs can be made to overlap in time with the operation of the memory banks. Thereby, the apparatus performs the work of the multiple reads and writes in essentially the cycle time of the memory banks providing a significant performance advantage over the prior art.

The embodiments described were chosen for the purpose of illustration of the preferred implementation of the invention. Those skilled in the art will recognize that modifications can be made without departing from the scope of the invention. It is intended that the scope of the invention be defined by the claims attached hereto.

We claim:

1. A memory apparatus, responsive to first, second and third addresses supplied within an instruction cycle from respective address registers, for supplying data read from the first and second addresses to output registers and for writing data received from an input register to the third address, comprising:

a first group of two memory banks, responsive at a predetermined time in the instruction cycle to the first address and the third address, for supplying data read from the first address in one of the two banks of said first group and for writing data received to the third address in the other bank of said first group;

a second group of two memory banks, responsive to the second address and the third address at said predetermined time, for supplying data read from the second address in one of the two banks of said second group and for writing data received to the third address in the other bank of the two banks of said second group; and pointer means for each group for controlling the two banks of each group so that the one of the two banks in one of said groups then containing valid data is read while data is written to the other bank of the same group in each cycle, valid data being the latest data written, as denoted by what had been stored in said pointer means.

2. The apparatus of claim 1, wherein the pointer means includes:

means for storing, in randomly addressable devices, each having a response time faster than that of the memory banks, pointers to that bank in the first group containing valid data at the first address and to that bank in the second group containing valid data at the second address.

3. The apparatus of claim 1, wherein the pointer means includes:

first means including multiplexer means responsive to the first address for supplying the first address to the one bank in the first group then containing valid data and the third address to the other bank of said first group; and second means including multiplexer means responsive to the second address for supplying the second address to the one bank in the second group then containing valid data and the third address to the other bank in said second group.

4. The apparatus of claim 1, wherein the pointer means includes:

means for storing pointers to the banks containing valid data in the first and second groups;

first means, responsive to the stored pointers, for supplying the first address to the one bank then containing valid data in the first group and the third address to the other bank in the first group; and second means, responsive to the stored pointers, for supplying the second address to the one bank then containing valid data in the second group and the third address to the other bank in the second group.

5. The apparatus of claim 4, wherein the pointer means further includes:

means, responsive to the first, second and third addresses within the instruction cycle, for reading from the means for storing pointers a first pointer for the first address and the first group and a second pointer for the second address and the second group to the one bank containing valid data in the first and second groups at the first and second addresses, respectively, and for writing to the means for storing pointers a first pointer and a second pointer to the other bank for the third address in the first and second groups, respectively.

6. A multiple port memory apparatus, responsive within an instruction cycle to $r + w$ addresses supplied from respective address registers, for supplying data read from r read addresses to output registers and for writing data received from input register means to w write addresses, said writing occurring without requirement of acknowledgement, comprising:

r groups each having $w+1$ memory banks, responsive at a predetermined time in the instruction cycle to the r read addresses and to the w write addresses, for supplying for each of the r read addresses data read from one of the $w+1$ banks in one of the r groups and for writing data received to each of the w write addresses in another of the $w+1$ banks in another of the r groups; and pointer means for each of the r groups for controlling the $w+1$ banks of each group so that the one of the $w+1$ banks in one of said r groups containing valid data is read while data is written to another bank of the same group in each cycle, valid data being the latest data written, as denoted by what had been stored in said pointer means.

* * * * *